Nov. 2, 1954
S. N. DOHERTY
2,693,550
TELEVISION RECEIVER
Filed May 20, 1952
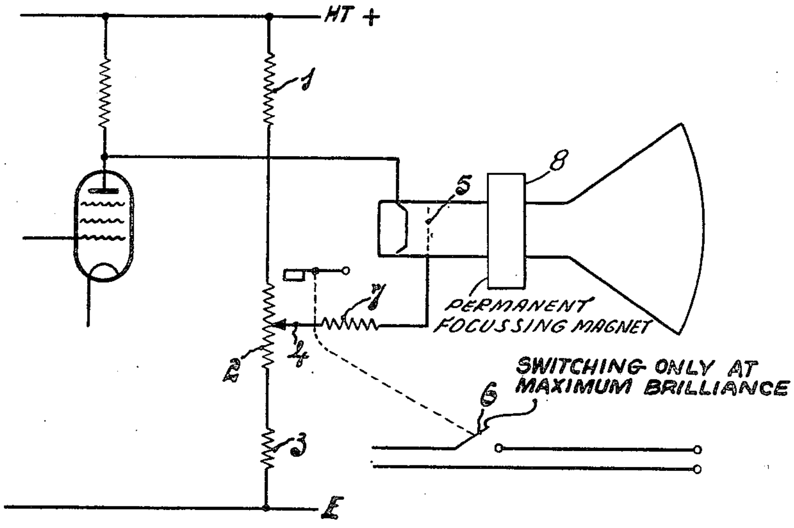
INVENTOR
Stephen Norman Doherty
BY Fred M Vogel
AGENT 2,693,550

United States Patent Office 2,693,550

Patented Nov. 2, 1954

2,693,550

TELEVISION RECEIVER

Stephen Norman Doherty, Carshalton, Beeches, England, assignor to Hartford National Bank and Trust Company, Hartford, Conn., as trustee Application May 20, 1952, Serial No. 288,924

Claims priority, application Great Britain May 22, 1951

1 Claim. (Cl. 315—30)

The invention relates to television receivers and has particular reference to receivers employing permanent magnet focussing of the cathode ray tube electron beam.

In television receivers of this type as hitherto constructed, it has been found that on switching off the receiver after a period of use the cathode ray tube electron beam tends to persist, due in part to the fact that its cathode remains hot for an appreciable time and in part to the charge held by the E. H. T. smoothing capacitor.

When the focussing of the C. R. tube beam is performed by a permanent magnet this persistance of the beam after the time bases have ceased to function results in a stationary focussed spot on the C. R. tube screen which may, if the E. H. T. potential also persists at a high enough value, be of sufficient intensity to damage the phosphor.

This effect is most marked if the set is switched off with the brillance control at its minimum position or when there is no modulation and consequently no electron beam.

As the C. R. tube cathode and grid potentials fall to zero potential the beam restarts under the action of the E. H. T. potential after the time bases have ceased to function.

The object of the invention is to reduce the possibility of such damage under these conditions.

According to the invention a television receiver employing a cathode ray tube having permanent magnet focussing is characterised by the provision of a combined brilliance control potentiometer and main on-off switch, the potentiometer and switch being so arranged and/or connected that the switch can only be operated with the control at its maximum brilliance position.

With such an arrangement, and assuming the receiver to be in operation the user will turn the brilliance control to maximum before the on-off switch is opened and thus the electrode of the C. R. tube to which the potentiometer slider is connected will be held at a potential which will permit the C. R. tube electron beam to discharge the E. H. T. capacitor even if there is no modulation.

In order that the invention may be more clearly understood, it will now be described in a practical embodiment which is given by way of example only with reference to the accompanying diagrammatic drawing.

In a television receiver employing a cathode ray tube with permanent magnet focussing and cathode modulation the cathode is maintained during operation at a standing positive potential (of the order of 150 volts) with respect to earth by reason of its connections to the sides output valve. In order to control the brilliance the C. R. tube control grid is adjusted to a slightly lower positive potential by a potentiometer forming part of a potential dividing network connected between the positive pole of the normal H. T. line (for example of 250 volts) and earth.

In one usual arrangement as shown in the drawing a fixed resistor 1 of suitable value is connected between the H. T. positive line and one end of the potentiometer 2 and another fixed resistor 3 is connected between the other end of the potentiometer and earth, the slider 4 being connected to the control grid 5 of the C. R. tube. The main on-off switch 6 of the receiver is mechanically combined with the brilliance potentiometer as indicated by the dotted line, instead of the sound volume control as is more usual, so as to be operated by the movement of the slider at one end of its travel. The potentiometer is so connected that when the switch is operated the slider is at the full brilliance end of its travel, this being the end of the resistance track connected to the H. T. line through the fixed resistor 1.

A permanent focussing magnet, which may be of a type well-known in the art, is shown schematically at 8.

It will be understood that the line and frame deflecting potentials do not collapse instantaneously since the cathodes of the time base valves remain hot after the heaters are switched off and the main H. T. smoothing capacitors continue for a short time to deliver current. At the instant the set is switched off, after a period of use, the grid-cathode potential of the C. R. tube by the arrangement above described, is such that there is an electron beam even in the absence of modulation of sufficient magnitude to discharge the E. H. T. capacitor before the line and frame deflecting potentials have collapsed.

With combined potentiometer and switch arrangements of the usual kind the potentiometer will be operated in an anticlockwise direction for increase of brilliance which is the opposite rotation to that usually employed. If desired, this hand of rotation may be reversed by arranging the switch to be operated to its "on" position by anticlockwise rotation of the control spindle. In this case the operating regime may be to switch on the set and continue to rotate the potentiometer to the other extreme of its travel then increasing the brillance by normal clockwise rotation to the desired position. To switch off the set, the control may be rapidly advanced to the full brilliance position until the switch is operated.

It will be understood that the usual control grid stopper resistor 7 may be included between the potentiometer slider 4 and the control grid 5 of the C. R. tube to limit the flow of grid current while permitting the grid to be held at a potential such that the electron beam from the C. R. tube cathode can form a discharge path of sufficient magnitude for the charge held by the E. H. T. capacitor to be dissipated in the time available.

What I claim is:

In a television receiver; a cathode-ray tube provided with permanent magnet focussing for displaying the incoming images, means including a potentiometer coupled to said tube to control the brilliance of said images, a power supply for said receiver including a main on-off switch for connecting said supply to an energizing source, and means mechanically linking said switch to said potentiometer to effect a switching-off operation only when said potentiometer is adjusted to a position producing maximum brilliance.

References Cited in the file of this patent

Rider Television Manual, vol. 1, Belmont TV, page 1-43-44, copyrighted June 1, 1948. (Copy in Div. 16.)